G. R. WYMAN & A. E. CURRIER.
MACHINE FOR COATING TUBES.
APPLICATION FILED JAN. 14, 1916.

1,216,039.

Patented Feb. 13, 1917.
8 SHEETS—SHEET 1.

Fig. 1.

Inventors
George R. Wyman
Andrew E. Currier,

By Dodge and Sons,
Attorneys

G. R. WYMAN & A. E. CURRIER.
MACHINE FOR COATING TUBES.
APPLICATION FILED JAN. 14, 1916.

1,216,039.

Patented Feb. 13, 1917.
8 SHEETS—SHEET 2.

UNITED STATES PATENT OFFICE.

GEORGE R. WYMAN AND ANDREW E. CURRIER, OF EAST WALPOLE, MASSACHUSETTS.

MACHINE FOR COATING TUBES.

1,216,039.  Specification of Letters Patent.  Patented Feb. 13, 1917.

Application filed January 14, 1916.  Serial No. 72,131.

*To all whom it may concern:*

Be it known that we, GEORGE R. WYMAN and ANDREW E. CURRIER, citizens of the United States, residing at East Walpole, in
5 the county of Norfolk and State of Massachusetts, have invented a certain new and useful Improvement in Machines for Coating Tubes, of which the following is a specification.

10 This invention pertains to an improved machine for coating tubes, the construction and advantages of which will be hereinafter set forth, reference being had to the annexed drawings, wherein:

Fig. 8 a transverse vertical sectional view on the line 8—8 of Fig. 2;

Fig. 9 a perspective view of a portion of
40 the tube feeding mechanism;

Fig. 10 a perspective view of the pot for containing the coating material;

Fig. 11 a perspective view of the doctor roll and its supporting frame;

45 Fig. 12 a perspective view of the opposite end of the tube runway from that disclosed in Fig. 9;

55 The present invention has for its object the production of a machine for expeditiously and thoroughly coating tubes exteriorly, and more specifically paper tubes. The machine in general terms may be said to comprise means for feeding tubes one at a time into line with a mandrel, which as it is advanced and finds its place in the tube is caused to rotate, the coating roll being brought into contact with the tube and the coating applied; after this is effected the coated tube is automatically transferred to a carrier, the transfer mechanism and the carrier being specially designed so as not to mar or injuriously affect the surface of the tube.

Referring to the drawings, 1 denotes the bed or table of the machine, supported by legs or columns 2, which latter are connected by suitable cross braces 3, as shown. Secured to and extending upwardly from the table at one end thereof are two vertically-disposed frames or castings 4 and 5, in and upon which certain elements of the machine find their bearing.

Figure 3:
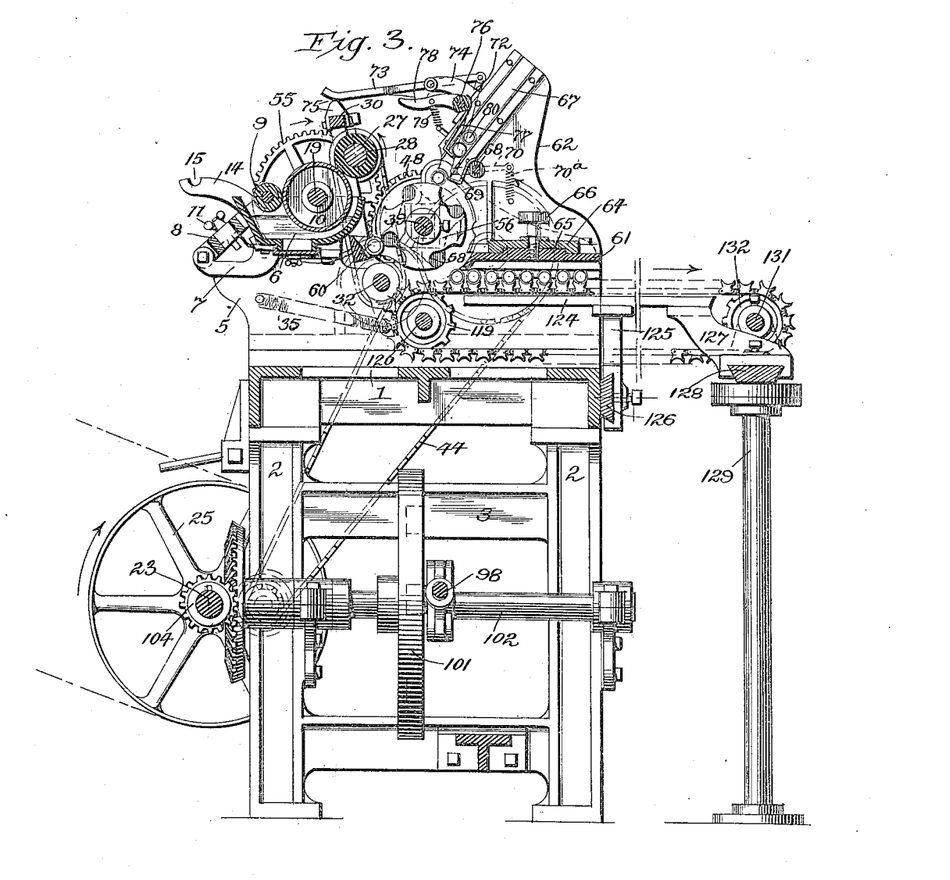
Fig. 3 a view similar to Fig. 1 taken on
20 the line 3—3 of Fig. 5.
Figures 8, 9, 10, 11, 12:
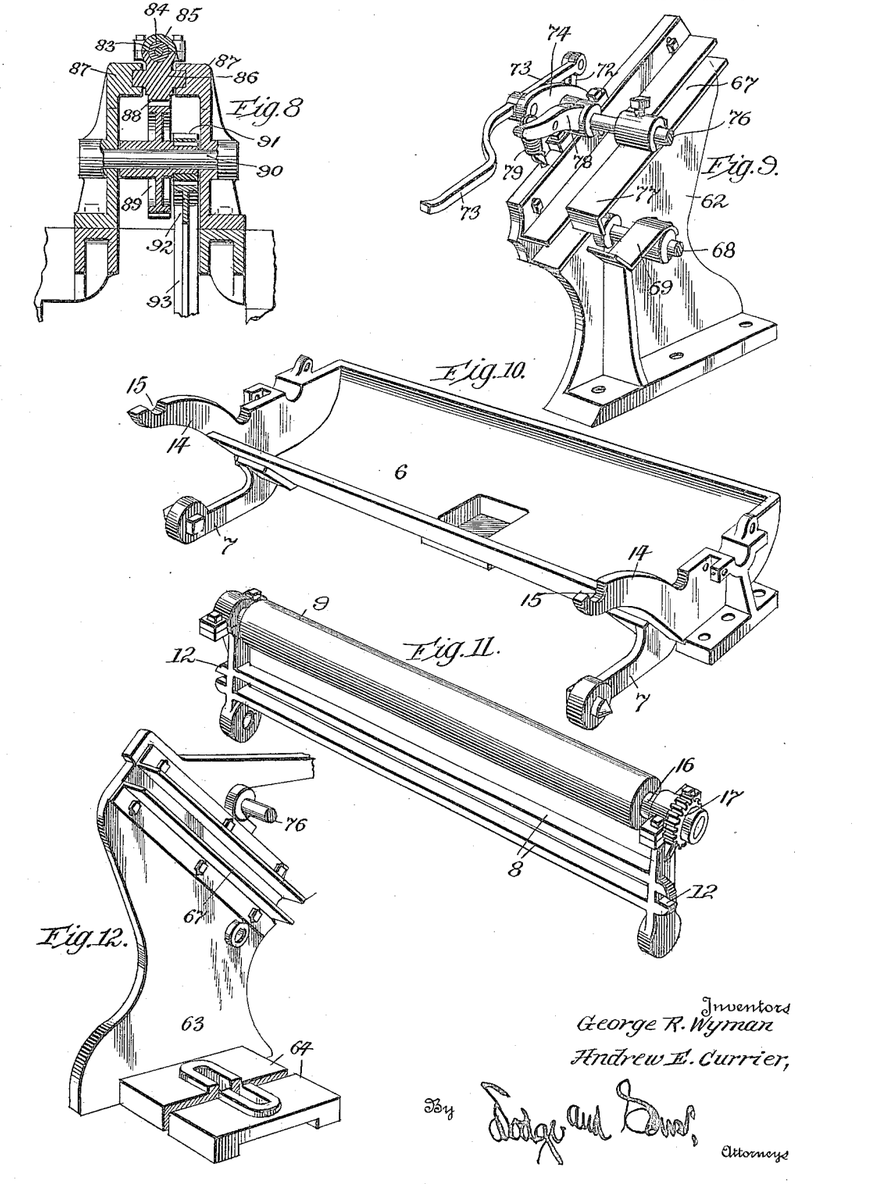

The pan 6, which contains the material with which the rolls are to be coated, is shown in detail in Fig. 10, and is mounted upon the upper portions of members 4 and 5, adjacent one end thereof. Brackets 7 extend outwardly from beneath the pan and form the pivotal support for the frame 8, Fig. 11, in the upper end of which is journaled a doctor roller 9, which when said frame is thrown inwardly coacts with main supply drum or roll 10, the lower portion of which runs in the fluid coating material, see Figs. 3 and 6. Frame 8 is held in its working position by wing nuts 11, which coact with lugs 12 formed upon frame 8, the nuts being mounted on bolts 13, pivotally mounted on the upper outwardly-extending portions of frames 4 and 5. A pair of arms 14 extend outwardly and upwardly from pan 6, said arms being each provided with a notch 15 in its upper face, adapted to form a temporary rest for the journal or shaft of the main coating roll, hereinafter referred to, when the machine is not in operation and said shaft is temporarily removed from its bearings.

Figures 4, 5:
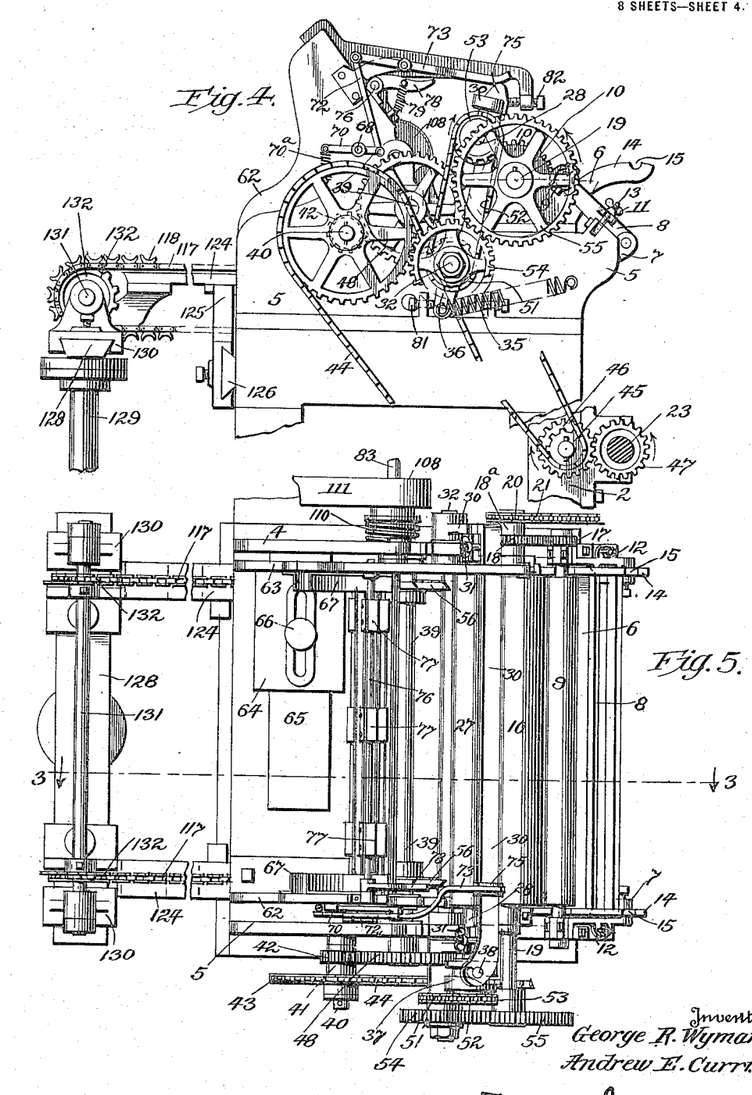
Fig. 4 an elevation of the upper portion of one end of the machine.
Fig. 5 a top plan view of the machine, the mandrel, its supporting and advancing
25 means being omitted.
Figure 15:
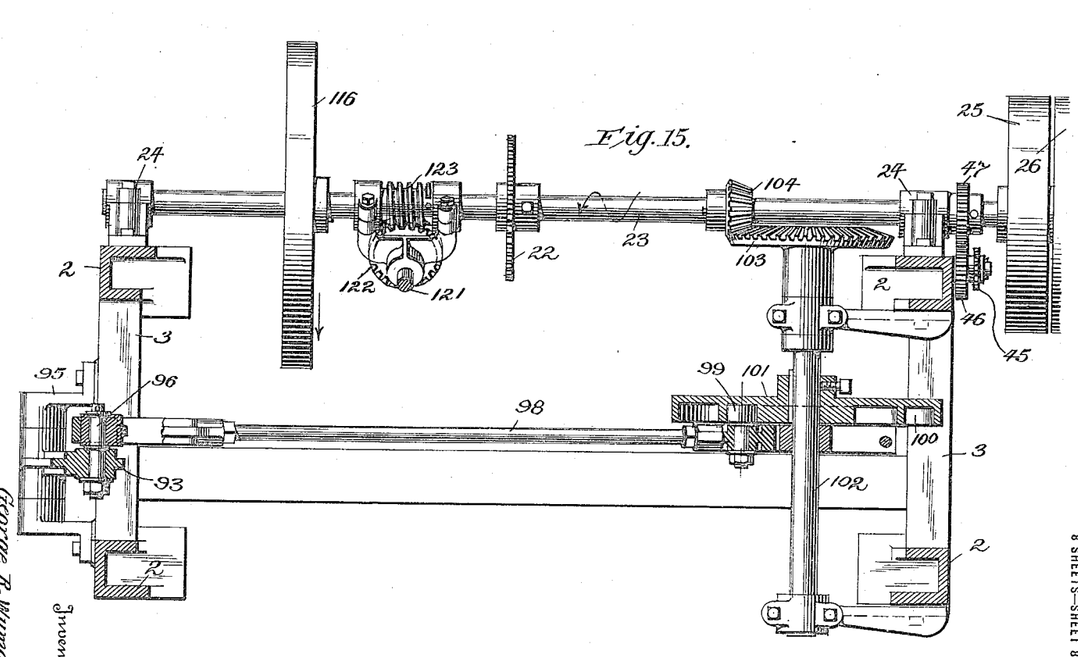
Fig. 15 a horizontal sectional view on the line 15—15 of Fig. 2.

Shaft 16 has secured to it a pinion 17, which meshes with a gear 18, secured upon a sleeve 18ª, Fig. 5, rigidly mounted upon roll shaft 19, said sleeve likewise having secured to it a sprocket wheel 20 over which passes a sprocket chain 21, the chain at its lower run engaging a sprocket 22 fixed upon the main driving shaft 23. Said shaft 23 is mounted in suitable bearings 24, see Fig. 15, secured upon a pair of the legs 2 and carries fast and loose belt pulleys 25, 26.

Figures 13, 14:
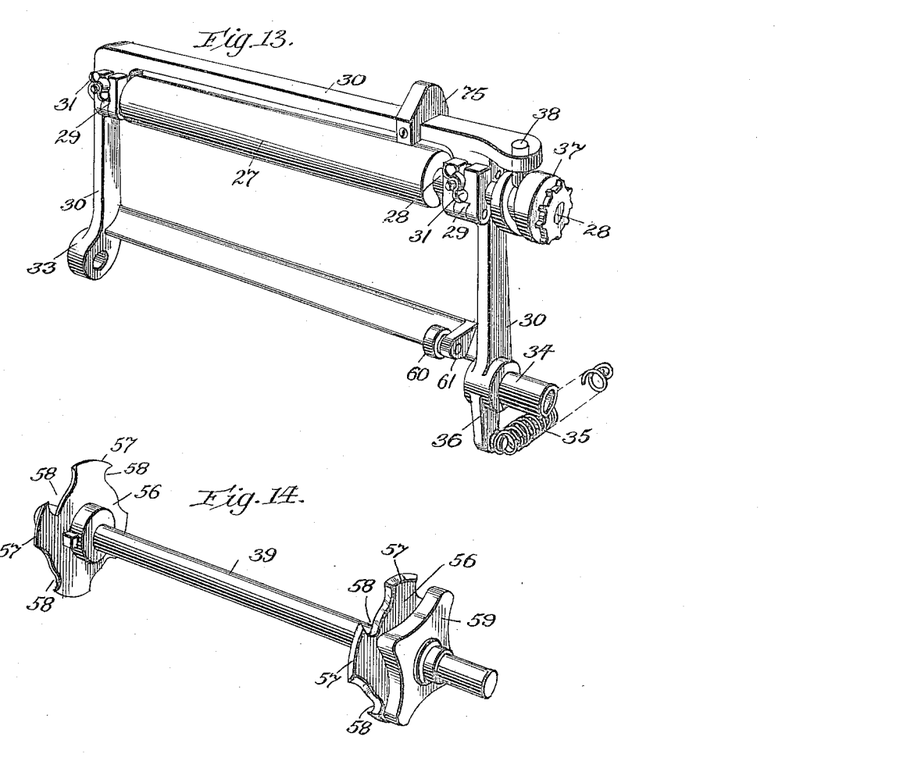
Fig. 13 a perspective view of the coating roller, and its supporting frame and allied
50 parts.
Fig. 14 a like view of the tube transfer.

The main coating roll, or that which comes into direct contact with the tubes as they are positioned relatively thereto is designated by 27, and as will be best seen upon reference to Fig. 13 is fixed to a shaft 28, journaled in split bearings 29 carried at the upper portion of a substantially rectangular frame 30. Wing nuts 31 hold the movable members of the bearings 29 in place, but permit the ready removal of the shaft and roller and the placement of the same in the notches 15 until such time as it is again desired to use the machine.

Frame 30 is mounted to oscillate upon a fixed shaft 32, mounted in the frame members 4 and 5, the shaft passing through a hub 33 at one end of the frame, and through a sleeve 34 at the opposite end of the frame. The upper end of the frame 30 is normally urged away from the supply drum 10 and toward the tube to be coated by a spring 35 secured at one end to frame 4 (Fig. 4) and at its opposite end to a depending arm 36, formed as an integral portion of frame 30.

Shaft 28 is free to move endwise in its bearings and to carry with it the coating roller 27 and to effect such motion the shaft is provided with a cam 37 into the groove of which extends a pin 38 fixed to frame 30. As the shaft is rotated an endwise reciprocating motion is imparted thereto.

39 denotes the shaft upon which the tube positioning and transfer mechanism or devices are mounted, said devices being hereinafter set forth in detail, said shaft being journaled in the side frames 4 and 5, and extending out and beyond the latter.

Rotatably mounted upon a stub axle 40, Figs. 4 and 5, secured to the side frame 5, is a sleeve 41, carrying a pinion 42 and a sprocket wheel 43. A sprocket chain 44, engages the latter and likewise engages a small sprocket wheel 45, Figs. 2, 4 and 15, the latter being mounted upon a sleeve in common with a pinion or gear wheel 46, the sleeve being mounted upon a stub axle secured to one of the legs 2. Gear 46 meshes with a similar gear 47 made fast to the main driving shaft 23, while pinion 42 meshes with gear wheel 48, secured to the outwardly-projecting end of shaft 39. Sleeve 50 carries a sprocket wheel 51, a chain 52 passing about the same and about a similar sprocket 53 secured upon the outer end of the coating roll shaft 28. Sleeve 50 likewise carries a gear wheel 54, which meshes with a larger gear 55 secured to shaft 19 of the coating drum 10.

The gears, pinions and sprockets are so proportioned that the desired and requisite speed will be imparted to each shaft and the part or parts carried thereby. Shaft 39, which rotates clockwise, has adjustably secured upon it, see more particularly Figs. 2, 5, 6, and 14, two disk-like members 56 alike in form. Each member is provided with a series of equidistant, cut-away portions forming a series of peripheral tube stop or arresting sections 57 and pockets 58, the former coacting with the tube feeding mechanism to position a tube in line with the advancing mandrel, hereinafter set forth, and the latter, 58, adapted to receive the coated tube from the mandrel and transfer it to the underlying conveying chains. The edge of each disk will preferably be made relatively sharp or narrow in order that the surface and coating on the tube will not be marred.

Figure 1:
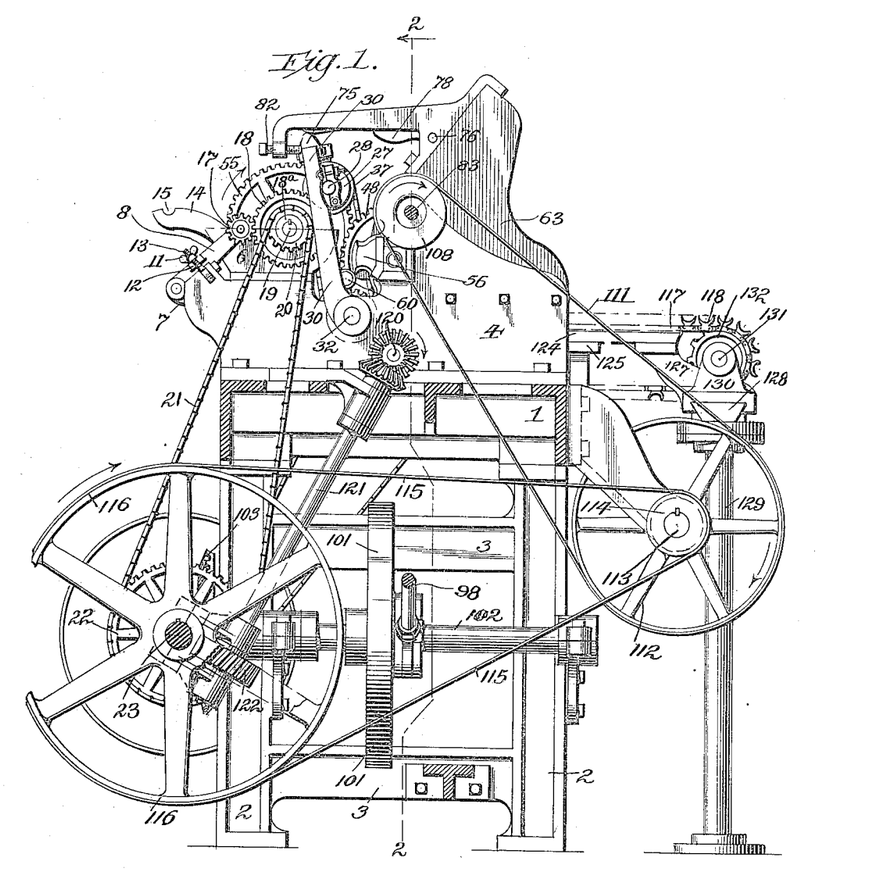
Figure 1 is a vertical transverse sectional view taken on the line 1—1 of Fig. 2.
Figure 6:
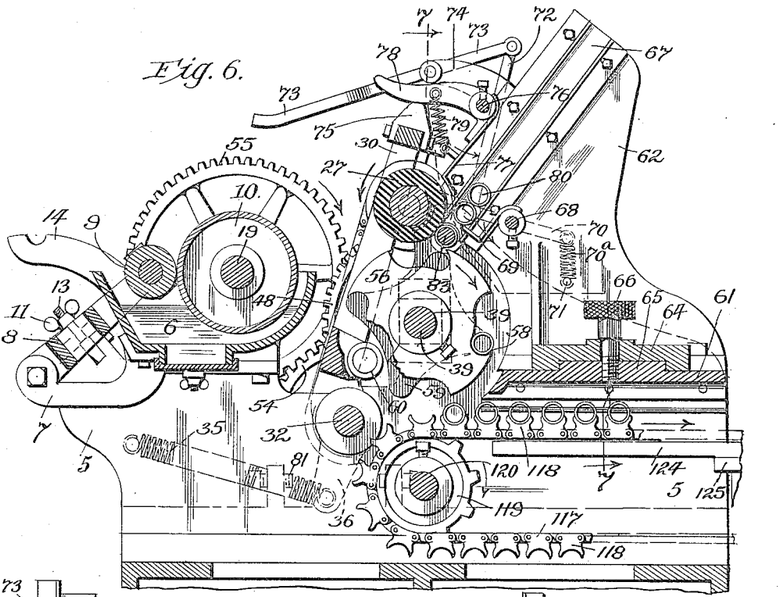
Fig. 6 a sectional view of the upper portion of the machine, the section being on the same line as that of Fig. 3, the parts being enlarged and the coating roll shown as
30 thrown forwardly into contact with the tube supported on the mandrel.

Shaft 39 also has secured to it a star-shaped cam 59, arranged in line with a roller 60, Figs. 1, 6 and 13, supported upon a pin carried by a lug 61 extending outwardly from the lower portion of frame 30. The cam is so positioned with reference to the disks that the cam swings frame 30 rearwardly and causes the coating roll 27 to contact with drum 10 at that time when the mandrel is being withdrawn from the just-coated tube and said tube is passed to the pockets in the disks, and another tube is being brought into position for reception of the mandrel when it is again advanced. The cam, it will be noted, works in opposition to spring 35.

Figure 7:
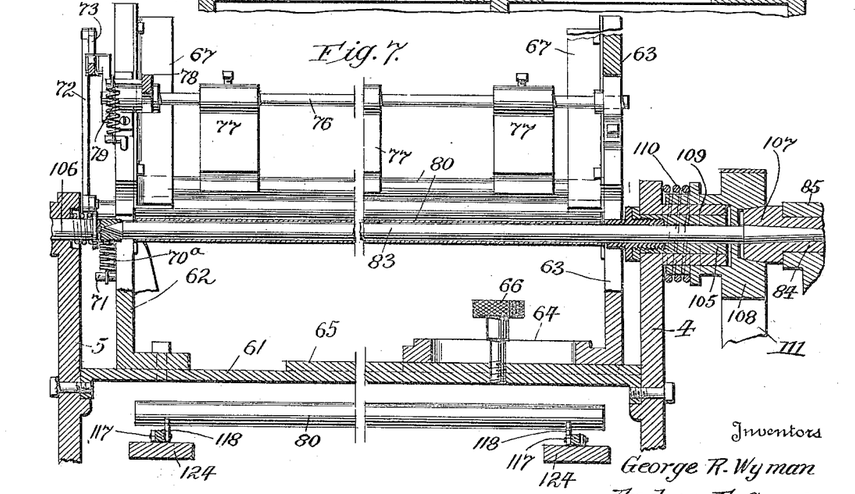
Fig. 7 a vertical sectional view, taken on the line 7—7 of Fig. 6, the mandrel being shown in position in the tube and the parts
35 in such relation that the mandrel and consequently the tube will be rotated.

Any suitable mechanism may be employed to feed or present the tubes to the mandrel one at a time. A preferred form is illustrated herein, reference being had more particularly to Figs. 4, 5, 6, 7, 9 and 12. Secured between the side frames 4 and 5 is a cross-bar 61, and rigidly affixed adjacent one end thereof is a vertically-disposed frame 62 (Figs. 7 and 9), while at the opposite end a second vertical frame 63 is adjustably mounted, said latter frame being provided with a horizontally-disposed, integrally-formed slide 64 mounted upon a guide-way 65, adapted to be held in its desired adjusted position by a locking screw 66. Such adjustment and adjustment of at least one of the disk members 56 is necessary to adapt the machine to tubes of different lengths.

Each of the frame members 62 and 63 is provided with a pair of downwardly-inclined parallel angle plates 67, the pairs being oppositely disposed and terminating at their lower ends short of the disks 56. Said plates form a runway reservoir for the uncoated tubes and mechanism is provided to release the tubes therefrom one at a time. A shaft 68, journaled in frames 62 and 63, underlies the runway adjacent its lower end, and carries one or more fixed fingers 69. A lever 70 is secured to the outer end of the shaft, outside of frame 62, and a spring 70$^a$, secured to the lower end of the lever and to a pin 71 extending outwardly from frame 62, tends to draw the lever down and to project the fingers into the path of the tubes. A link 72 is connected to the opposite end of the lever and in turn is pivotally connected to the rear end of a second lever 73, pivoted on a fixed arm 74. The forward end of the lever 73 is inwardly offset so that it stands in line with a cam block 75, secured upon the upper member of frame 30, Figs. 4, 5, 6 and 13.

A second shaft 76 finds its supports in bearings at the upper portion of frames 62 and 63, said shaft carrying a plurality of downwardly-extending fingers 77. Said shaft has secured to it a lever 78 which is normally drawn downwardly by a spring 79, the fingers 77 being thereby urged into the path of the descending tubes 80. Fingers 69 and 77 are spaced apart approximately the distance of the diameter of a tube and the former are retracted from beneath the lowermost tube in the runway as the latter are projected inwardly, and vice versa. This action is effected through the springs and the cam 75 which coacts successively with levers 73 and 78, the cam being brought into action by the oscillating or swinging movement of frame 30.

Adjustable stop screws 81 and 82, Figs. 1, 4, 5 and 6, limit the outward swinging movement of frame 30 and facilitate the adjustment of the cam 59 with reference to the roller 60 thereon.

Just as a tube is released from the runway and comes to rest upon the peripheral portions 57 of the disks 56, a mandrel 83 is inserted therein, raising the tube from the disk and causing the tube to be rotated and that at a speed somewhat in excess of that of the peripheral speed of the coating roll which is brought into contact therewith.

The mechanism by which this is effected is best shown in Figs. 1, 2, 6, 7, 8 and 15. The mandrel 83 is pointed at its inner end, the opposite end being secured in a bushing or sleeve 84, journaled in a bearing block 85, extending upwardly from a slide 86 mounted to reciprocate in a fixed guide-way 87 secured to the bed of the machine. Slide 86 is provided with a rack 88, on its under face, with which meshes a gear 89, rotatably mounted on a shaft 90 (Fig. 8) carried by the side walls of the guide-way. A pinion 91, secured upon the hub of gear 89, meshes with a sector rack 92 formed upon the upper end of a lever 93, fulcrumed upon a shaft 94 carried by a pair of brackets 95, secured to the adjacent cross-bar 3. A wrist-pin 96 adjustably mounted in a slot 97 in the lever connects the same to a pitman 98 which is actuated through the agency of a roller 99, working in the groove 100 of a cam 101. Said cam is mounted on a countershaft 102 driven through gears 103 and 104 from the main driving shaft 23, Fig. 15. The mandrel 83 is shown in its retracted position in Fig. 2 and its free pointed end lies within a guiding sleeve or bushing 105 in line with a tube 80 which has been fed down onto the underlying sections 57 of the disks 56. As the slide 86 advances the mandrel passes into the tube, the pointed end facilitating such entrance, said end finally passing out or beyond the tube and finding a bearing in a spring-pressed rotatable plug 106 mounted in a recess or bearing formed in the side frame 5. At the same time, the tapered end 107 of the sleeve or bushing 84 passes into the recessed end of a pulley 108, the pulley finding its bearing on a sleeve 109 extending outwardly from frame 4. A spring 110 urges the pulley into close contact with the member 107, the two constituting in effect a friction clutch. A belt 111 passes over pulley 108 and about a belt wheel 112, Fig. 1, the shaft 113 whereof carries a pulley 114 about which passes a belt 115, said belt passing about band wheel 116, secured on the main driving shaft 23.

The mandrel as it enters the tube slightly raises the same, thus freeing the tube from the members 57 and leaving the tube free to be entirely coated by the coating roll 27, which then comes into action. Upon retrograde movement of the mandrel the tube is freed and drops into the underlying pair of pockets 58, the disks meanwhile having been advanced to bring them into position.

The interval of time the mandrel is permitted to remain in the tube before it begins to withdraw and the consequent length of time the coating roller 27 remains in contact with the tube is readily determined and regulated by the formation of the cam groove 100 and the cam 59; the mandrel should be retained within the tube as long as the coating roller 27 is in contact with the tube.

As the transfer disks rotate, the coated tubes reach a point where they roll out of the pockets, and a suitable receiver is preferably employed to take care of them. In the form shown two underlying endless conveyer chains 117 are provided, each chain having secured thereto a series of vertically-disposed thin plates 118, the upper ends of which are concave in outline, each oppositely disposed pair of plates forming in effect a cradle for the reception of a coated tube.

Figure 2:
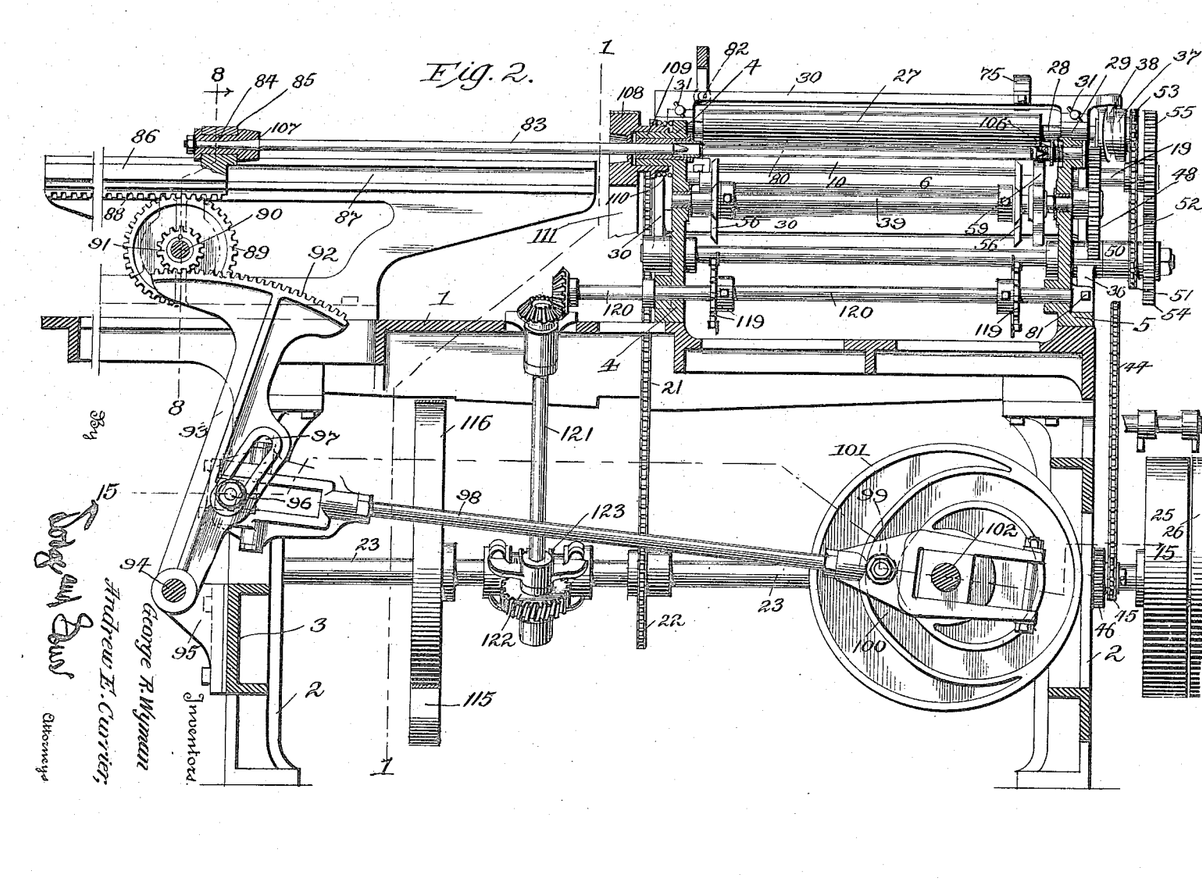
Fig. 2 a vertical longitudinal sectional view taken on the line 2—2 of Fig. 1.

The chains at their inner bight pass about a sprocket 119, mounted on a shaft 120, Fig. 2, journaled in the side frames 4 and 5, said shaft being driven from a countershaft 121 which derives its motion through a worm wheel 122, which meshes with and is driven by a worm 123 secured upon driving shaft 23.

The upper runs of the chains 117 overlie plates 124, Figs. 1, 3, 4, 5 and 7, the plates in turn being supported by longitudinally adjustable brackets 125 mounted on a guide 126, secured to the skirt of the bed 1 and by brackets 127 adjustably secured on a slide-way or cross-bar 128. Said bar is mounted on a post 129. Bearings 130 for a shaft 131 are likewise mounted on the cross-bar 128, said shaft carrying a pair of sprocket wheels 132 for the chains 117.

By having the various sprockets adjustably mounted on the shafts and the supporting brackets likewise adjustable, the machine may be adjusted to accommodate tubes of different lengths.

The chains 117 will be made of such length as to permit the coating to dry or become sufficiently hard or set so as not to be injuriously affected by handling. The chains could, of course, be run through a drier.

It is thought that the operation of the machine will be clearly understood without a resumé of the same.

While the construction has been set forth somewhat in detail, it will be readily appreciated that the machine may be modified in many of its details and yet fall within the generic scope of the invention.

The term "coating" employed in the specification and claims is to be considered in the broad sense, it being immaterial whether the material or substance applied produces strictly a surface coating or finish, or sinks into the body of the tube in part or in whole.

Having thus described our invention, what we claim is:

1. In a machine for coating tubes, the combination of a normally non-rotating mandrel; means for moving the same into and out of a tube to be coated; means for causing rotation of the mandrel as the same is positioned within the tube; and means for applying coating material to the exterior of the tube while it is supported by the mandrel.

2. In a machine for coating tubes, the combination of tube-feeding means; tube-supporting means; a mandrel; means for causing said mandrel to enter the tube and raise it from said supporting means; and means acting in timed relation with said mandrel to exteriorly coat the tube while supported on the mandrel.

3. In a machine for coating tubes, the combination of tube-feeding means; means to temporarily support the tubes as they are fed thereto one at a time; a mandrel normally non-rotating; means for causing said mandrel to enter and lift the tube from the support; means to effect a rotation of the mandrel when fully positioned within the tube; and means acting in timed relation with said mandrel to exteriorly coat the tube while supported on the mandrel.

4. In a machine for coating tubes, the combination of tube-feeding means; means to temporarily support the tubes as they are fed thereto, one at a time; a mandrel; means for advancing and withdrawing the same into and from the tube; means for causing the mandrel to rotate when fully positioned within the tube; a coating roller; and means for bringing said roller into operative position with the tube supported by the mandrel.

5. In a machine for coating tubes, the combination of a temporary support for the tube to be coated; a mandrel normally non-rotating; means for advancing and withdrawing the same into and from the tube and upon the entrance of the mandrel to cause a lifting of the tube from the support; means for rotating the mandrel when fully positioned within the tube; and means for coating the tube while supported on the mandrel.

6. In a machine for coating tubes, the combination of a temporary support for the tube to be coated; a mandrel adapted to be projected into said tube and to lift the tube from said support; means for causing rotation of the mandrel as it reaches its position within the tube; and means for coating the tube while it is supported on the mandrel.

7. In a machine for coating tubes, the combination of a combined temporary support and transfer device for the tube to be coated; a mandrel adapted to be projected into said tube and to remove the tube from its support; means for coating the tube while supported on the mandrel; a receiver for the coated tubes; and means for shifting the first-named device, while the tube is being coated, to bring it into position to receive the coated tube and to transfer it to the receiver.

8. In a machine for coating tubes, the combination of a combined temporary support and transfer device for the tube to be coated; a mandrel adapted to be projected into said tube and to remove the tube from its support; a coating roll; a frame therefor movable toward and from the mandrel; a receiver for the coated tubes; and driving connections for operating the recited elements in proper time and sequence.

9. In a machine for coating tubes, the combination of a combined temporary support and transfer device for the tubes to be coated; a reservoir for the tubes; means for discharging the tubes therefrom one by one onto said device; a coating roll; a frame therefor movable toward and from the tube supported on said first-named device; a mandrel adapted to be moved into and out of the tube on said device; a receiver for the coated tubes; and driving connections for operating the recited elements in proper time and sequence.

10. In a machine for coating tubes, the combination of a reservoir for holding the tubes to be coated; a combined temporary tube-support and transfer device, comprising a pair of disk-like members each having a series of peripheral supporting sections and intermediate pockets; means for feeding the tubes one by one from the reservoir onto the supporting sections; a mandrel adapted to be projected into the tube thus positioned; means for coating the tube while supported on the mandrel; a receiver for the coated tubes; and driving connections for operating the recited elements in proper time and sequence.

11. In a machine for coating tubes, the combination of a pair of disk-like members mounted to rotate in unison, each disk having a series of peripheral supporting sections and intermediate pockets, the edges of the members being relatively thin; means for feeding the uncoated tubes thereto; a mandrel; means for reciprocating the mandrel and thereby causing it to enter and withdraw from a tube; and means for coating the tubes while supported by the mandrel.

12. In a machine for coating tubes, the combination of a reservoir for the uncoated tubes; a temporary support for the tubes as they are released one by one from said reservoir; a mandrel movable back and forth and adapted to enter the tube released from the reservoir and resting on the temporary support; a frame movable toward and from the mandrel; a coating roller carried thereby; and means actuated by the frame for releasing the tubes one by one from said reservoir.

13. In a machine for coating tubes, the combination of means for temporarily supporting the tube to be coated; a normally non-rotatable mandrel; means for introducing the same into the temporarily-supported tube and by such action to lift it from the supporting means; means for effecting rotation of the mandrel, and consequently the tube, when the mandrel is positioned in the tube; and means for coating the tube while thus supported and rotated.

14. In a machine for coating tubes, the combination of means for temporarily supporting the tube to be coated; a reciprocating slide; a mandrel; a rotatable support therefor carried by the slide and embodying a clutch member; a second rotating clutch member adapted to coact with the clutch member on the mandrel support when the latter is brought into contact with said second clutch member; and means for coating the tube while supported on the mandrel.

15. In a machine for coating tubes, the combination of means for temporarily supporting the tube to be coated; a reciprocating slide; a mandrel; a rotatable support for one end thereof carried by the slide and embodying a clutch member; a second rotating clutch member adapted to coact with the aforesaid clutch member when the mandrel is fully positioned within the tube; an endwise movable, yielding support for the free end of the mandrel when the mandrel is fully positioned within the tube; and means for coating the tube while supported on the mandrel.

In testimony whereof we have signed our names to this specification.

GEORGE R. WYMAN.
ANDREW E. CURRIER.

Copies of this patent may be obtained for five cents each, by addressing the "Commissioner of Patents, Washington, D. C."